(12) United States Patent
Burago et al.

(10) Patent No.: US 7,770,111 B2
(45) Date of Patent: Aug. 3, 2010

(54) METHOD AND COMPUTER READABLE MEDIUM FOR OPTIMIZED PARAGRAPH LAYOUT

(75) Inventors: Andrei Burago, Kirkland, WA (US); Christoph E. Ammann, Sammamish, WA (US); Sergey Genkin, Kirkland, WA (US); Eliyezer Kohen, Mercer Island, WA (US); Victor Kozyrev, Issaquah, WA (US); Anton A. Sukhanov, Bellevue, WA (US); Igor Zverev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 11/018,917

(22) Filed: Dec. 20, 2004

(65) Prior Publication Data

US 2006/0136818 A1 Jun. 22, 2006

(51) Int. Cl.
*G06F 17/21* (2006.01)
*G06F 17/27* (2006.01)

(52) U.S. Cl. ............... 715/256; 715/243; 715/246; 715/247; 715/251; 715/258

(58) Field of Classification Search ............ 715/508, 715/521, 530, 517, 243, 246, 247, 251, 256, 715/258
See application file for complete search history.

(56) References Cited

U.S. PATENT DOCUMENTS

| | | | | |
|---|---|---|---|---|
| 4,574,363 A | * | 3/1986 | Carlgren et al. ............ | 715/258 |
| 5,438,512 A | | 8/1995 | Mantha et al. ............. | 715/234 |
| 6,223,191 B1 | | 4/2001 | Truelson .................... | 715/205 |
| 6,321,243 B1 | | 11/2001 | Ballard ...................... | 715/202 |
| 6,647,533 B1 | * | 11/2003 | Liu et al. ................... | 715/517 |
| 6,766,495 B1 | * | 7/2004 | Bates et al. ................ | 715/531 |
| 6,915,484 B1 | * | 7/2005 | Ayers et al. ................ | 715/517 |
| 6,928,610 B2 | * | 8/2005 | Brintzenhofe et al. ...... | 715/517 |
| 6,948,119 B1 | * | 9/2005 | Farmer et al. .............. | 715/517 |
| 7,020,838 B2 | | 3/2006 | Tsykora ..................... | 715/241 |
| 7,028,258 B1 | * | 4/2006 | Thacker et al. ............. | 715/525 |
| 7,191,390 B2 | | 3/2007 | Williamson et al. ........ | 715/251 |

(Continued)

OTHER PUBLICATIONS

Lawrence M. Brown, "Linked Lists", published: Sep. 1999 www.apl.jhu.edu, p. 13, http://www.apl.jhu.edu/Notes/LMBrown/courses/605-202/notes/Linked-Lists.pdf.*

(Continued)

*Primary Examiner*—Stephen S Hong
*Assistant Examiner*—Wilson Tsui
(74) *Attorney, Agent, or Firm*—Merchant & Gould

(57) ABSTRACT

A method and computer-readable medium are provided for optimized paragraph layout. According to the method, a line-by-line paragraph layout is generated determine a maximum penalty for a paragraph. One or more layout nodes may be generated that include data representing a possible layout of the paragraph to a point within a backing store and identifying any changes to a geometry of the page caused by the layout of the paragraph defined by the layout node. A penalty is also calculated for each of the layout nodes. Each layout node that has a penalty less than the maximum penalty calculated during the line-by-line formatting processing is added to the node pool. This process repeats until only a single layout node remains in the node pool that represents the entire paragraph of text.

16 Claims, 8 Drawing Sheets

U.S. PATENT DOCUMENTS

| | | | |
|---|---|---|---|
| 7,191,396 B2 * | 3/2007 | Williamson et al. | 715/513 |
| 7,401,290 B2 * | 7/2008 | Wormely | 715/247 |
| 7,596,752 B2 | 9/2009 | Marks et al. | 715/255 |
| 2002/0069219 A1 | 6/2002 | Weng | 707/501.1 |
| 2002/0124023 A1 | 9/2002 | Wormley | 707/517 |
| 2003/0167448 A1 | 9/2003 | Williamson et al. | 715/251 |
| 2003/0192011 A1 | 10/2003 | Williamson et al. | 715/525 |
| 2003/0229845 A1 * | 12/2003 | Salesin et al. | 715/500 |
| 2005/0094475 A1 | 5/2005 | Naoi | 365/232 |
| 2006/0129923 A1 | 6/2006 | Tsykora | 715/527 |
| 2006/0136818 A1 | 6/2006 | Burago et al. | 715/518 |
| 2006/0227153 A1 | 10/2006 | Anwar et al. | 345/660 |
| 2006/0265649 A1 | 11/2006 | Danilo | 715/542 |
| 2006/0294460 A1 | 12/2006 | Chao et al. | 715/520 |
| 2007/0038928 A1 | 2/2007 | Marks et al. | 715/234 |
| 2007/0186155 A1 | 8/2007 | Williamson et al. | 715/518 |
| 2008/0282149 A1 | 11/2008 | Williamson et al. | 715/251 |

OTHER PUBLICATIONS

Heidi Steele, "Sams Teach Yourself Microsoft Office Word 2003 in 24 Hours", published: Sep. 19, 2003, publisher: Sams, pp. 1-3.*

European Communication dated Aug. 25, 2008 cited in Application No. 05111638.2-1527 / 1672521.

U.S. Office Action dated Dec. 29, 2008 cited in U.S. Appl. No. 11/205,361.

Remco R. Bouckaert, "A Probabilistic Line Breaking Algorithm," Google 2003, pp. 390-401.

Chinese First Office Action dated Feb. 13, 2009 cited in Application No. 200510126790.9.

Hiroshi Hosobe, "Solving Linear and One-Way Constraints for Web Document Layout," ACM Symposium on Applied Computing, 2005, pp. 1252-1253.

Teresa L. Roberts et al., "The Evaluation of Text Editors: Methodology and Empirical Results," Communications of the ACM, Apr. 1983, vol. 26, No. 4, pp. 265-283.

Hanan Samet, "Heuristics for the Line Division Problem in Computer Justified Text," Communications of the ACM, Aug. 1982, vol. 25, No. 8, pp. 564-571.

Brown, Parallel processing and Document Layout, Electronic Publishing: Origination, Dissemination and Design UK, vol. 1, No. 2, Sep. 1998 (pp. 97-104).

Bruggemann-Klein et al., On the Pagination of Complex Documents, Computer Science in Perspective. Essays Dedicated to Thomas Ottmann, Springer-Verlag Berlin Germany, 2003 (pp. 49-68).

Knuth et al., Breaking Paragraphs into Lines, Software Practice & Experience, Wiley & Sons, Bognor Regis, GB, vol. 11, Jan. 1, 1981 (pp. 1119-1184).

International Search Report dated May 29, 2008, EP App. No. 05111638.2-1527 (12 pages).

* cited by examiner

METHOD AND COMPUTER READABLE MEDIUM FOR OPTIMIZED PARAGRAPH LAYOUT

BACKGROUND OF THE INVENTION

When a user types text into a word processing application program, or other type of page layout application program, the program will lay the typed text out line-by-line and will periodically "break" the flow of text at appropriate points in order to move to a new line. This line breaking process typically results in one or more paragraphs, each of which is defined by one or more lines having breakpoints marking the beginning and ending of each line. One common problem that arises in word processing application programs and other page layout programs is the problem of determining where in the paragraph each line should be broken.

Most word processing applications break text line-by-line and do not consider the formatting of adjacent lines. For instance, most word processing applications begin by formatting the first line from the first character of a paragraph and finding the best line break for the line. Some factors that may be taken into account when locating the best break include whether a paragraph is ragged-right or justified, whether compression is permitted on the line, whether hyphenation is permitted, and other factors. After locating the best break for the first line, the application continues formatting the second line with the first character after the break of the first line in a similar manner. Each subsequent line is formatted in the same way.

An optimized paragraph layout algorithm was developed for the TeX program by Professor Donald Knuth. The algorithm developed by Knuth considers all possible ways to break a paragraph into lines. In particular, the algorithm calculates a penalty function to evaluate the quality of each way of breaking the paragraph into lines. Based on the results, the algorithm chooses the best way to break the paragraph. The approach set forth by Knuth improves the typographic quality of text by improving the uniform distribution of white space between lines for justified paragraphs and the appearance of ragged-right paragraphs. In order to accomplish these benefits in linear time, Knuth's algorithm applies techniques of dynamic programming.

Although the algorithm provided by Knuth does provide a number of benefits, it is not without its drawbacks. In particular, the Knuth algorithm can only break text for a page having a predefined geometry. The algorithm does not provide for the inclusion of figures that are attached to particular points in the character stream and can be positioned anywhere on the page, changing the geometry of the page during formatting. Because the algorithm provided by Knuth only allows justification (compression or expansion) between words, it does not operate with text in languages that allow justification inside words or languages that do not have white spaces between words. Moreover, the Knuth algorithm fails to produce an acceptable formatting result in certain typographically bad cases-usually in narrow columns with a small number of justification opportunities. In these cases, the Knuth algorithm simply produces lines that overflow the right margin and informs the user about the error. In the context of a word processing application program it is unacceptable to provide such a result to an end user.

It is with respect to these considerations and others that the various embodiments of the present invention have been made.

BRIEF SUMMARY OF THE INVENTION

In accordance with the present invention, the above and other problems are solved by a method and computer-readable medium for optimized paragraph layout. According to embodiments of the invention, a paragraph layout algorithm is provided that works well with languages that utilize justification within words and languages that do not utilize white space between words, that works well with figures that may be placed anywhere on the page, and that also provides a formatting result even in bad cases.

According to one embodiment of the invention, a computer-implemented method and computer-readable medium are provided for laying out a paragraph of text. According to the method, one or more layout nodes may be generated that represent a possible layout of some or all of the text in the paragraph. The layout nodes also include data identifying any changes to the geometry of the page on which the text is being laid out as a result of the layout specified by the layout node. Layout nodes are generated by identifying a layout node in a node pool as a current node. The first layout node in the pool is an empty node. New layout nodes are created from the current layout node by appending each possible variant of the next line of text to the current layout node. In this manner, new layout nodes are generated for the current node plus each possible break on the next line of text.

A penalty is also calculated for each of the newly generated layout nodes. Each layout node that has a penalty less than the maximum penalty calculated during the line-by-line formatting processing is added to the node pool. The current layout node is then removed from the node pool. On the next pass, the current layout node is the layout node having the lowest penalty. This process repeats until only a single layout node remains in the node pool that represents the entire paragraph of text.

According to one embodiment of the invention, a penalty function is provided that begins by defining an "acceptable typography limit." Lines that must be formatted outside of this limit are considered to be very bad lines and their penalty is calculated according to a different set of rules. In particular, if a line is considered to be very bad then its penalty is calculated based on the amount of white space it introduces to the page. As a result, very bad lines have large penalties, but their penalties grow at a much slower rate than penalties for lines that are not considered very bad. The result is that lines that are otherwise acceptable will not be turned into very bad lines when trying to improve the quality of other bad lines. This allows the algorithm to produce a reasonable layout that does not overflow the right margin even in some bad typographical cases having narrow columns.

According to another embodiment of the invention, the layout process may be optimized by first generating a line-by-line paragraph layout for the text to determine a maximum penalty for the paragraph. According to an embodiment, the line-by-line paragraph layout is performed by iteratively processing the text line by line to locate a best possible break for each line. A line services component may be utilized to provide sets of possible line breaks for the text. Moreover, formatting and possible break information generated by the line services component may be cached for improved performance during the paragraph layout process. Other types of line-by-line algorithms may also be utilized.

During the line-by-line paragraph layout, a penalty function may also be utilized to calculate a penalty for each individual line in the paragraph. The penalty for each of the lines are added to calculate a penalty for the entire paragraph. Additionally, according to an embodiment, any figures that are on the same page as the paragraph following the line-by-line layout may be identified. This information may be utilized later to ensure that another layout of the paragraph does not cause the figures to be pushed to a subsequent page.

According to another embodiment of the invention, the paragraph layout process may be optimized by merging layout nodes that end at the same point in the text. In particular, a determination is made as to whether any nodes in the node pool end at the same point in the text. If layout nodes do end at the same point, an additional determination may be made as to whether the geometry of the layout nodes is different as the result of an object on the page. If the geometry of the layout nodes is not different as the result of an object on the page, the node or nodes having a higher penalty than the other node or nodes ending at the same point are deleted from the node pool. This results in fewer calculations since nodes that would have resulted in a higher final penalty for the entire paragraph are not considered.

According to another embodiment, layout nodes may also be removed from the node pool that cause any of the figures identified during the line-by-line layout to be pushed to a subsequent page. A performance optimization may also be made by determining whether the more nodes exist in the node pool than a predefined threshold number. If too many nodes exist in the node pool, a number of the layout nodes may be removed from the node pool that have the highest penalties. In this manner, the performance of the layout algorithm is improved by reducing the size of the node pool.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
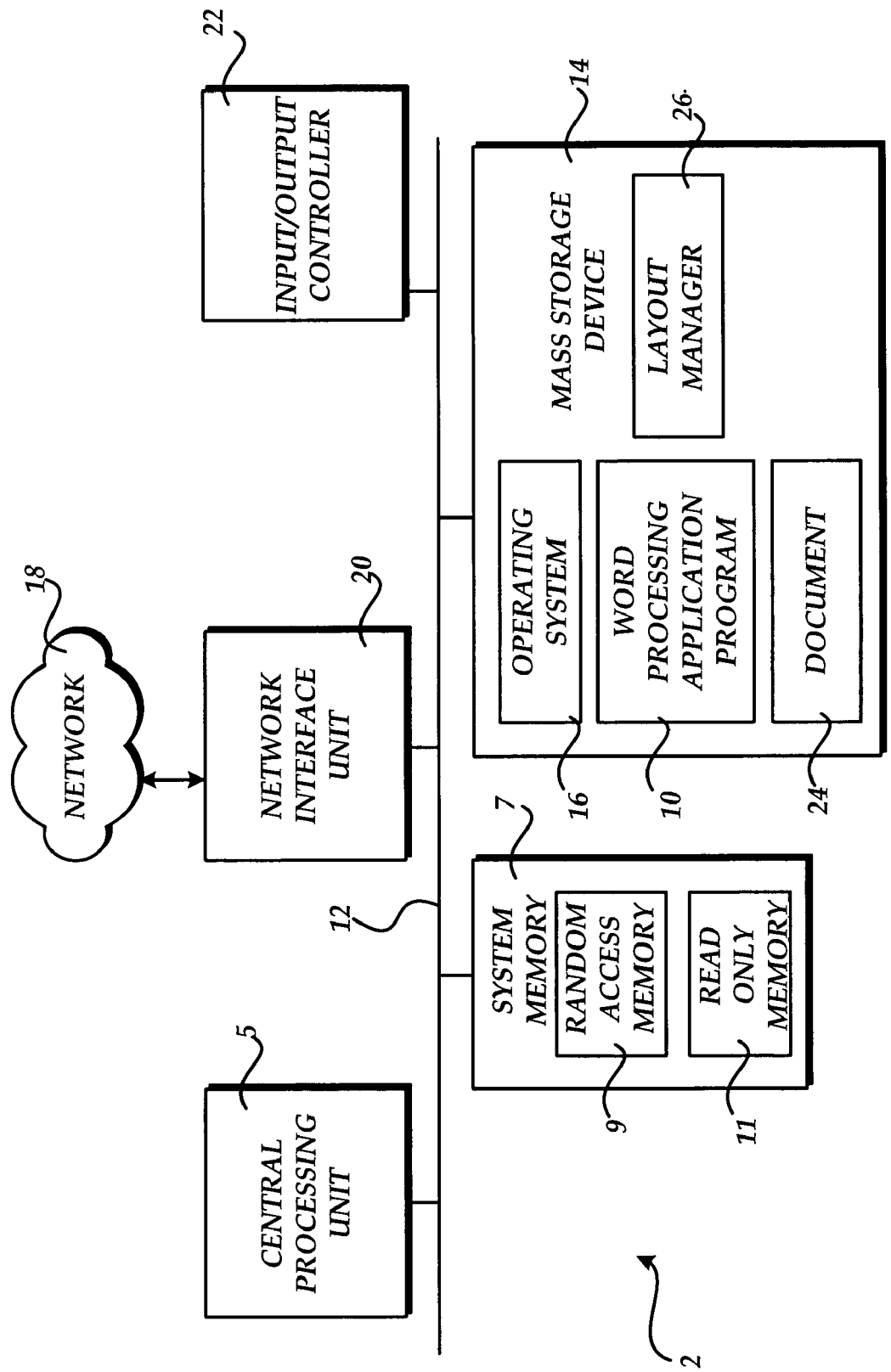
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. As known to those skilled in the art, the word processing application program 10 is operative to provide functionality for creating and editing electronic documents, such as the document 24. According to one embodiment of the invention, the word processing application program 10 comprises the MICROSOFT WORD word processing application program from MICROSOFT CORPORATION. It should be appreciated, however, that other word processing application programs from other manufacturers may be utilized to embody the various aspects of the present invention. It should also be appreciated that other types of application programs that perform document layout functions may be utilized with the aspects of the present invention. For instance, the embodiments of the present invention may be utilized with desktop publishing programs, presentation programs, web browsers, and any other type of program that utilizes text paragraphs in a document.

In conjunction with the editing of a word processing document, the word processing application program 10 provides functionality for laying out paragraphs of text in a document 24. The word processing application program 10 may communicate with a layout manager 26 to assist in the formatting of the document 24, including the lay out of text paragraphs. As will be described in greater detail below, the layout manager 26 provides layout services to the word processing application program 10, and to any other program executing on the computer 2. In particular, the layout manager 26 performs an algorithm to lay out paragraphs of text in an optimal way. Additional details regarding the operation of the layout manager 26 will be provided below with respect to FIGS. 2-6.

Figure 2:
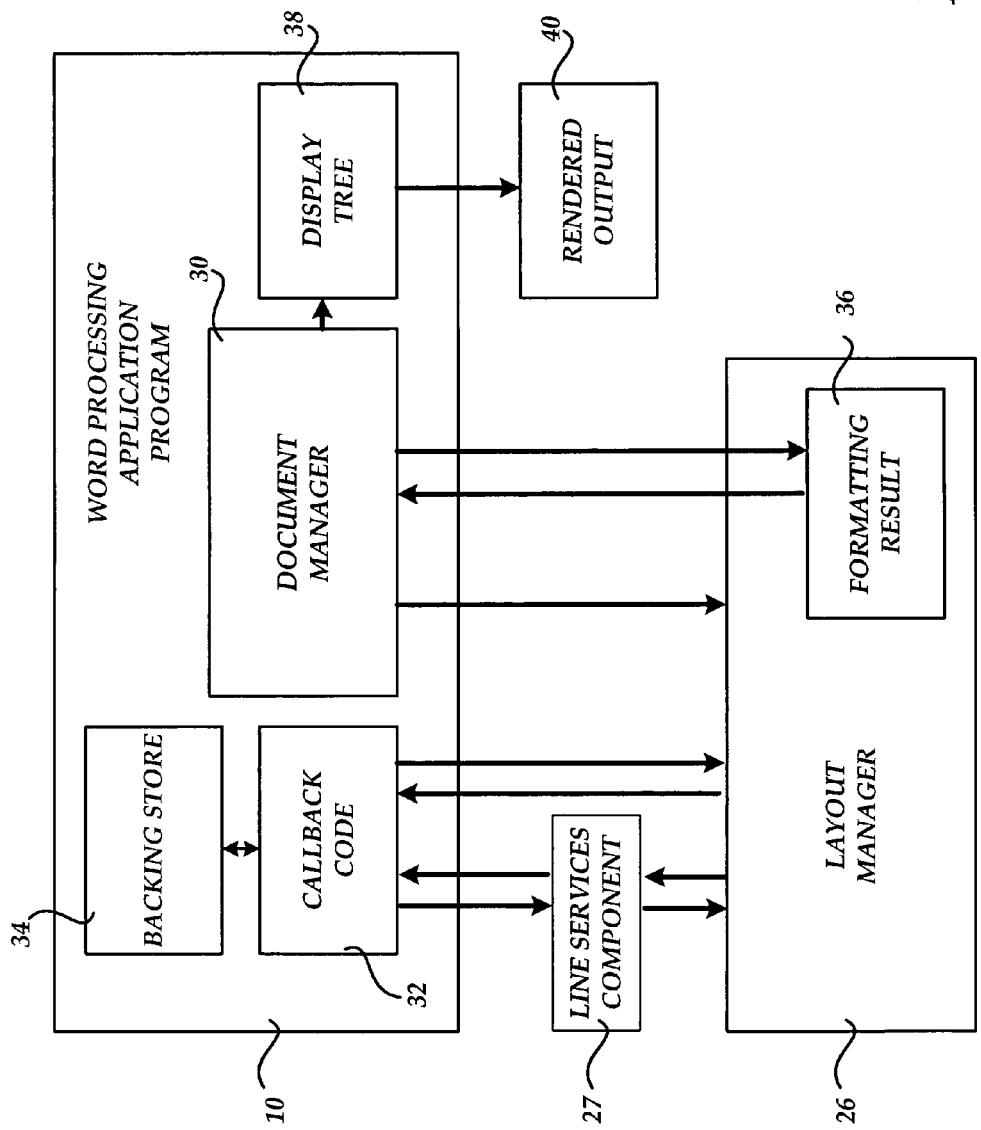
FIG. 2 is a software architecture diagram that illustrates aspects of several software components utilized in the embodiments of the invention.

Turning now to FIG. 2, additional details will be provided regarding the interaction between a client application, such as the word processing application program 10, and the layout manager 26. As described briefly above, the layout manager 26 provides document layout services to the application 10. In particular, the application 10 may communicate with the layout manager 26 to request the layout of portions of a document 24 stored in a backing store 34. In order to facilitate communication with the layout manager 26, the application 10 may implement one or more callback routines, illustrated in FIG. 2 as callback code 32. Through the use of the callback code 32, the layout manager 26 may query the application program 10 for additional information necessary to lay out various portions of the document.

As will be described in greater detail below, the layout manager 26 provides facilities for laying out paragraphs of text. The layout manager 26 provides these facilities in response to a request from the application program 10 to lay out a paragraph. The document manager 30 of the application program 10 may communicate with the layout manager 26 to request that a paragraph be laid out. The document manager 30 may also provide to the layout manager 26 the text and other content from the document that should be laid into the paragraph. The document manager 30 may initially provide some of the content to the layout manager 26. The layout manager 26 may then request additional content from the callback code 32 as needed to lay out the text. The document manager 30 may also indicate to the layout manager 26 the style of the text to be laid out. For instance, the document manager 30 may indicate the typestyle, size, and other information necessary to lay out the text to the layout manager 26.

During the process of laying out paragraphs of text, the layout manager 26 may utilize the services of a line services component 27. The line services component 27 is language-independent and is operative to provide services with respect to single lines of text. In particular, the line services component 27 can produce sets of possible breaking points for a span of text. Potential breaking points include (for Western languages) space characters, hyphen characters, and grammatically correct breaking points within words. The line services component 27 can also determine where between-character justification can be made for any language. According to embodiments of the invention, the line breaking information produced by the line services component 27 may be cached by the layout manager 26 to improve performance during the paragraph layout process.

As will be described in greater detail below, the break point information produced by the line services component 27 may be utilized by a penalty function executing within the layout manager 26 to determine which breaking points and, consequently which paragraphs of text, are better than others. The penalty function calculates a "penalty" for each paragraph by computing a penalty for each line in the paragraph. Factors that may influence the calculation of the penalty are the amount of white space to distribute on a line as opposed to the number of good justification opportunities or the amount by which to compress as opposed to the number of compression opportunities. Other factors may include whether the line has a hyphen, whether an immediately previous or subsequent line is also hyphenated, and the difference in length between consecutive lines. Another factor that may be utilized is the "quality" of a particular hyphenation. For instance, the hyphenation of the word "automobile" as "auto-mobile" is a better choice than "automo-bile." A dictionary may be utilized to determine whether one hyphenation is better than another. Other factors may also be utilized by the penalty function.

According to embodiments of the invention, the penalty function utilized by the layout manager 26 may be computed differently depending upon the text being analyzed. In particular, an acceptable typography limit may first be defined. A first penalty may be calculated for lines that lie within the defined acceptable typography limit. In these cases, penalty functions utilized by previous line breaking algorithms provide a good solution. A second penalty may be utilized, however, for lines that lie outside the bounds of reasonable typography. These lines are considered to be very bad lines. The second penalty is calculated according to the white space the line introduces to the page. As a result, very bad lines have large penalties, but their penalties grow at a much slower rate than penalties for lines that are not considered very bad. The result is that lines that are otherwise acceptable will not be turned into very bad lines when trying to improve the quality of other bad lines. This allows the algorithm to produce a reasonable layout that does not overflow the right margin even in some bad typographical cases without a sufficient number of justification opportunities.

Once the layout manager 26 has laid out the text in the manner described herein, a formatting result 36 is passed back to the document manager 30. In response to receiving the formatting result 36, the document manager 30 is operative to update the display tree 38 maintained by the application program 10. Based on the changes to the display tree 38, the application program 10 may update its rendered output 40 to display the formatting result to a user. Additional details regarding the operation of the application 10 and the layout manager 26 are provided below with respect to FIGS. 3-6.

Figure 3B:
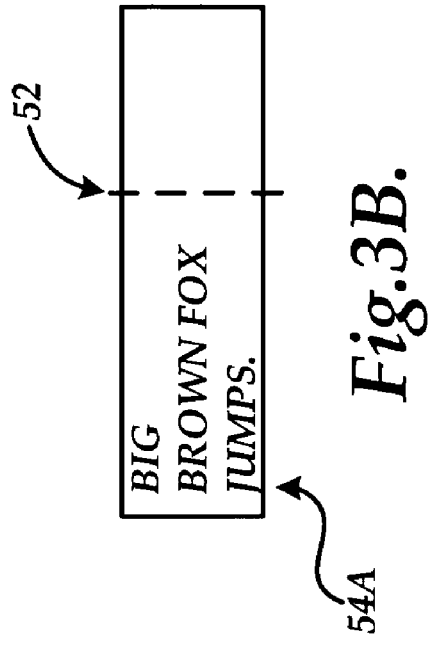
FIGS. 3A-3D are block diagrams illustrating aspects of an exemplary paragraph of text and several possible paragraph layouts for the paragraph.
Figure 3D:
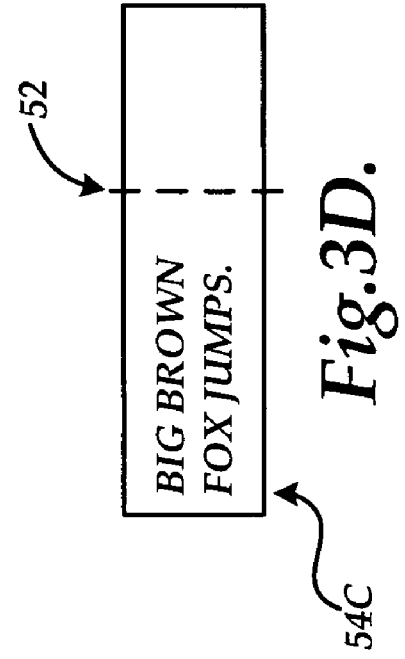
Figure 3A:
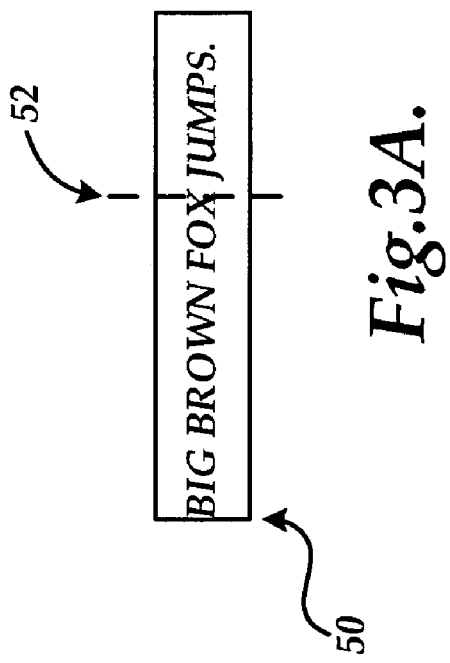

Turning now to FIGS. 3A-3D, aspects of an exemplary paragraph 50 will be described. As shown in FIG. 3A, the paragraph 50 comprises a span of text. In the illustrated example, the text comprises only a single sentence, however, any length of text may be formatted in the manner described herein. A margin 52 may also be specified that is relevant in determining the appropriate layout for the paragraph 50. In particular, it is typically desirable to avoid crossing the margin 52 while leaving a minimum amount of whitespace between the end of a line and the margin 52.

Figure 3C:
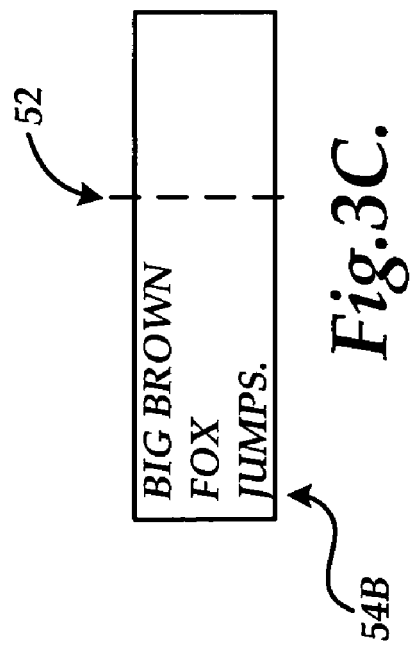

The paragraph layouts 54A-54C shown in FIGS. 3B-3D illustrate several of the many possible layouts of the paragraph 50. In particular, the layouts 54A and 54B are three line layouts and the layout 54C is a two line layout. The layout 54C is considered the most desirable because each line has a minimum of whitespace as compared to the layouts 54A and 54B. It should be appreciated that many other layouts are possible and that many other factors other than the amount of whitespace may be considered when choosing a best layout from a number of possible layouts.

Figure 4A:
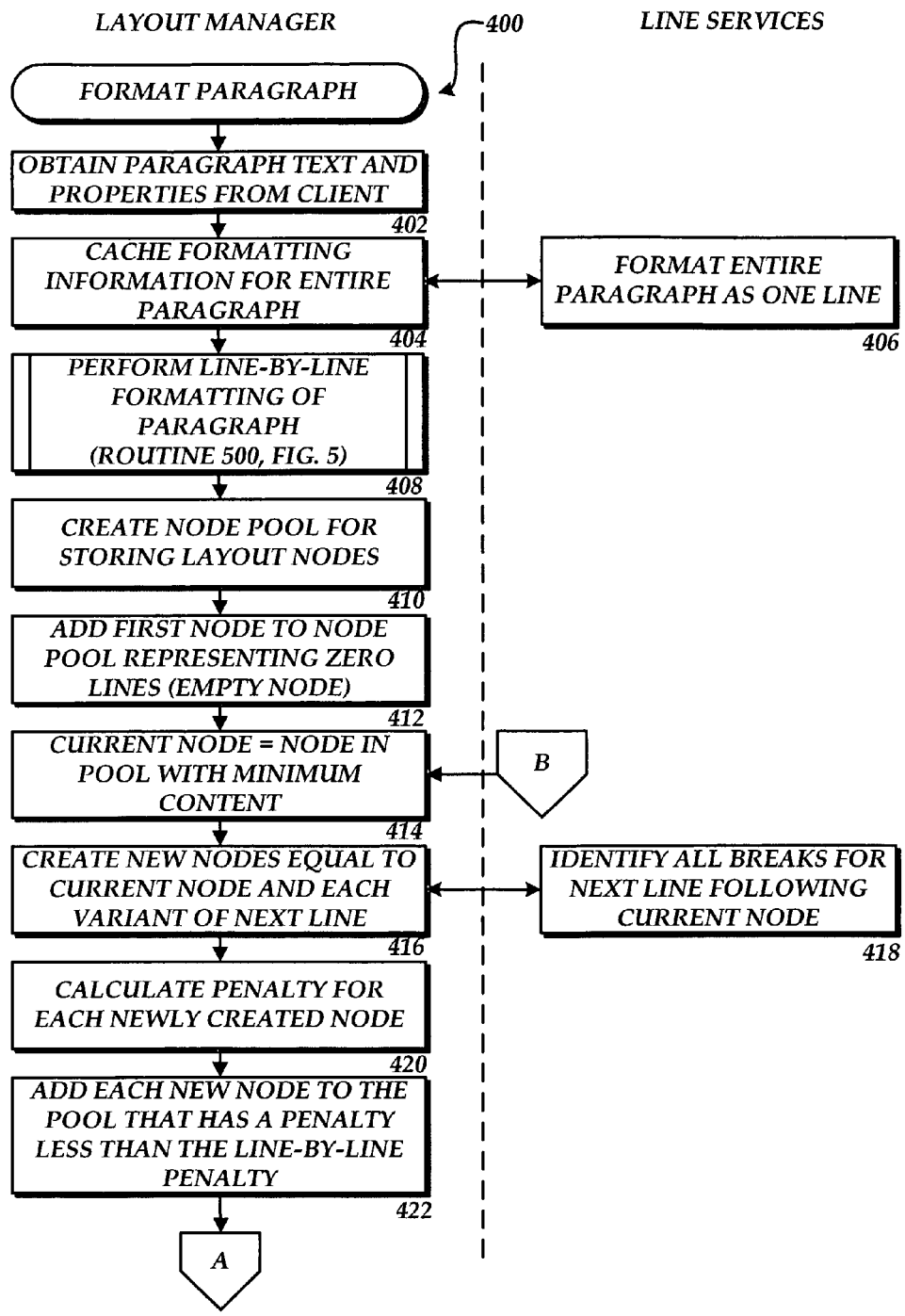
FIGS. 4A-4C and 5 are flow diagrams illustrating an exemplary routine for providing an optimal paragraph layout according to one embodiment of the invention.
Figure 4B:
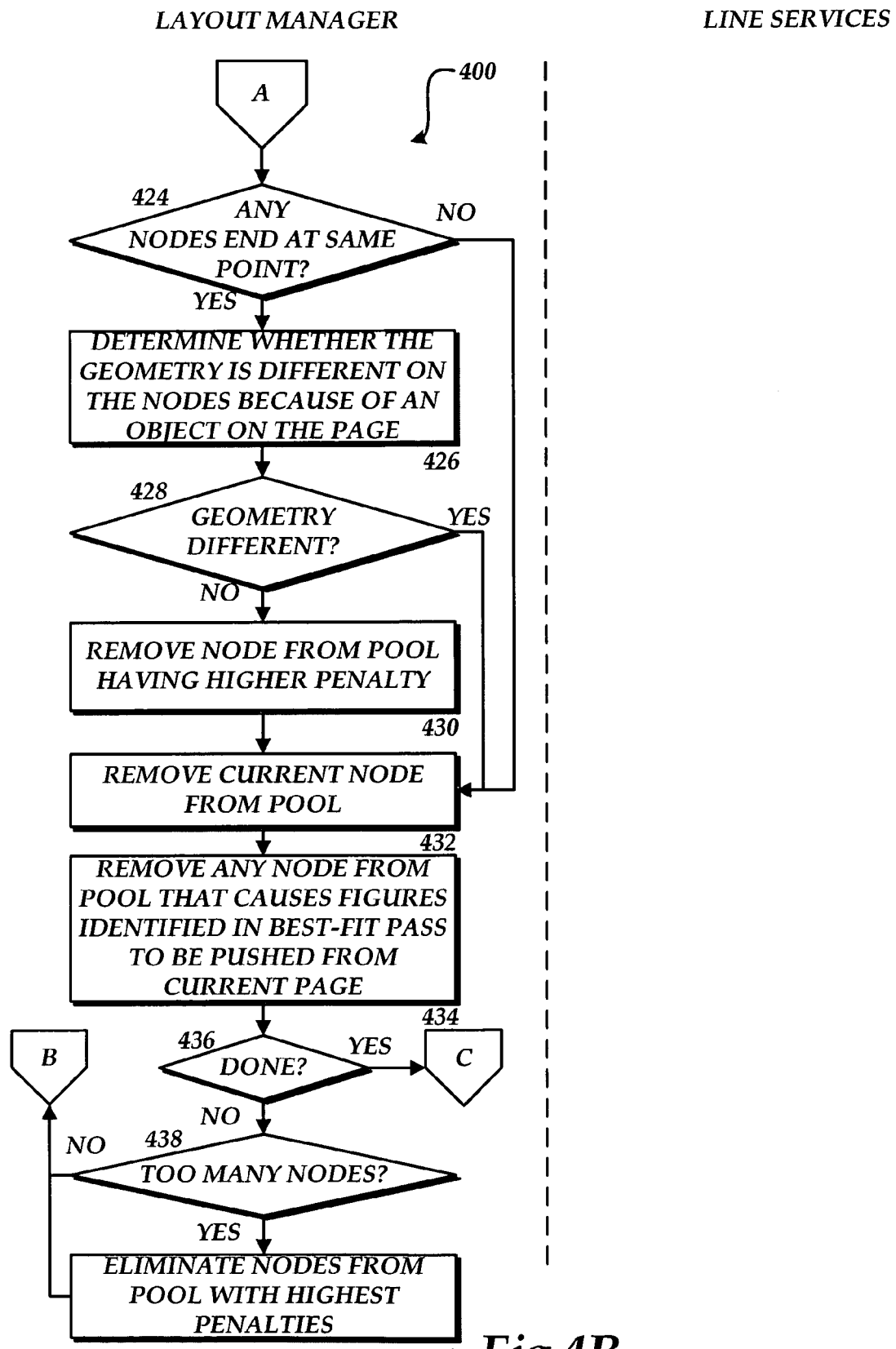
Figure 4C:
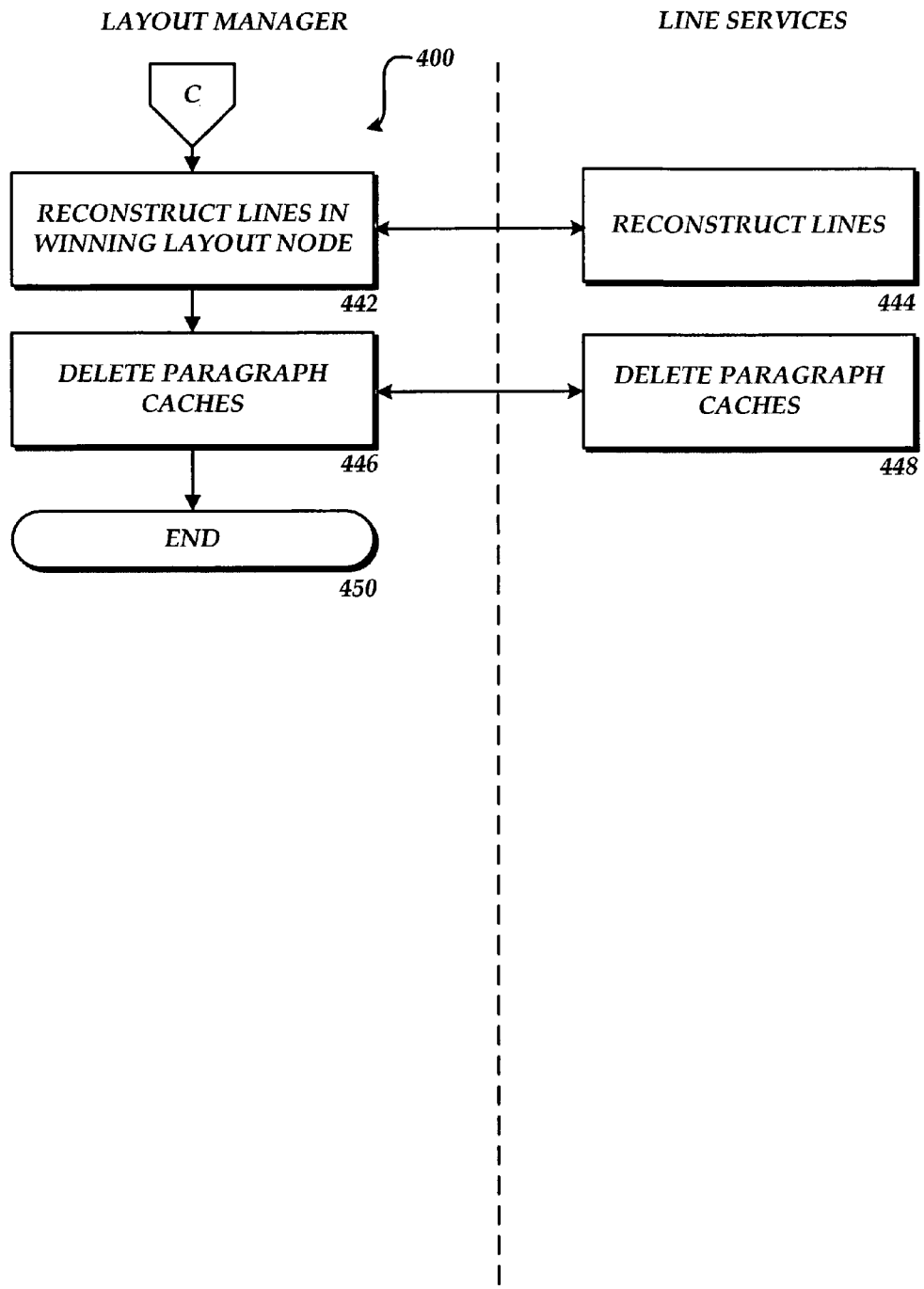

Referring now to FIGS. 4A-4C, an illustrative routine 400 will be described illustrating a process performed by the layout manager 26 for laying out a paragraph. It should be appreciated that although the embodiments of the invention described herein are presented in the context of a layout manager 26 and a word processing application program 10, the invention may be utilized in other types of application programs that must format lines of text. For instance, the embodiments of the invention described herein may be utilized within a spreadsheet application program, a presentation application program, or a drawing or computer-aided design application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4A-4C, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 402, where the layout manager 26 obtains the text to be formatted, including its properties, from the client application (e.g. the word processing application 10). The routine 400 then continues to operation 402, where the layout manager 26 instructs the line services component 27 to format the entire paragraph of text as one line with an infinite margin and to identify all of the possible breaking points within the line. The line services component performs this task at operation 406 and returns the formatting result to the layout manager 26. At operation 404, the layout manager 26 caches all of the formatting information associated with the paragraph and the breaking information provided by the line services component 27. The routine 400 then continues from operation 404 to operation 408.

At operation 408, a line-by-line format is generated for the paragraph. During the line-by-line paragraph formatting process, a maximum penalty is calculated for the paragraph. Additionally, a number of figures on the page that contains the paragraph may be identified. As will be described in greater detail below, this information is utilized to optimize the paragraph layout process. An illustrative routine 500 will be described below for performing the line-by-line paragraph layout. From operation 408, the routine 400 continues to operation 410.

At operation 410, a node pool is created for storing one or more layout nodes. The node pool is a data structure configured to store layout nodes representing the formatting of a paragraph to a particular point in the backing store 34. From operation 410, the routine 400 continues to operation 412, where a first layout node is added to the node pool. The first layout node is empty and represents a partial layout of the paragraph of zero lines. The routine 400 then continues to operation 414, where a current layout node is identified as the layout node in the node pool having the least amount of content. The routine 400 then continues from operation 414 to operation 416.

At operation 416, new layout nodes are created. In particular, a number of new layout nodes are created that correspond to the current layout node plus each possible variant of the next line of text. To produce these nodes, the line services component 27 identifies all possible breaks for the line of text following the current layout node at operation 418. A penalty is then calculated for each of the newly created layout nodes at operation 420. The routine 400 then continues from operation 420 to operation 422.

At operation 422, each newly created layout node is added to the node pool that has a penalty less than the maximum penalty computed during the line-by-line layout. Layout nodes having a higher penalty are not added to the node pool since the line-by-line layout provides a better layout than these nodes and has already been calculated. The routine 400 then continues from operation 422 to operation 424.

At operation 424, a determination is made as to whether any nodes in the node pool end at the same position in the text. If no two or more nodes end at the same position, then the routine 400 branches to operation 432, described below. If two or more nodes do end at the same position, the routine 400 continues to operation 426. At operation 426, a determination is made as to whether the geometry of the nodes ending at the same position is different because of an object present on the page containing the nodes. If the geometry is not different, an assumption may be made that the node with the higher penalty will cause the final formatted paragraph to also have a higher penalty. Accordingly, in these cases, the node with the higher penalty may be removed from the node pool and eliminated from further consideration.

If, at operation 428, it is determined that the geometry of the nodes ending at the same point is different because of an object on the page, the routine 400 braches to operation 432, described below. If the geometry is not different, the routine 400 continues to operation 430 where the matching node or nodes having the higher penalty are removed from the node pool. The routine 400 then continues to operation 432 where the current node is removed from the node pool. The routine 400 then continues from operation 432 to operation 434.

At operation 434, layout nodes are removed from the node pool that would cause any of the figures identified during the line-by-line layout to be pushed from the current page to a subsequent page. The routine 400 then continues to operation 436 where a determination is made as to whether a formatting result has been found. In particular, a formatting result will be located when only a single layout node remains in the node pool that represents the entire paragraph of text. If a formatting result has been found, the routine 400 branches to operation 442, described below. Otherwise, the routine 400 continues to operation 438.

At operation 438, a determination is made as to whether the number of layout nodes in the node pool exceeds a predetermined number. If the number of nodes does not exceed the threshold number of nodes, the routine 400 branches back to operation 414, described above. If the number of nodes does exceed the threshold value, the routine 400 continues to operation 440, where a number of layout nodes having the highest penalties are removed from the node pool. In this manner, these nodes will be eliminated from consideration and the amount of time necessary to compute the formatting result will be reduced. From operation 440, the routine 400 returns to operation 414, described above.

At operation 442, the layout manager 26 calls the line services component 27 to reconstruct the lines in the formatting result. This takes place at operation 444. The routine 400 then continues to operation 446 where the paragraph caches are deleted by the layout manager 26. The line services component 27 deletes its caches at operation 448. The routine 400 then continues from operation 446 to operation 450, where it ends.

Figure 5:
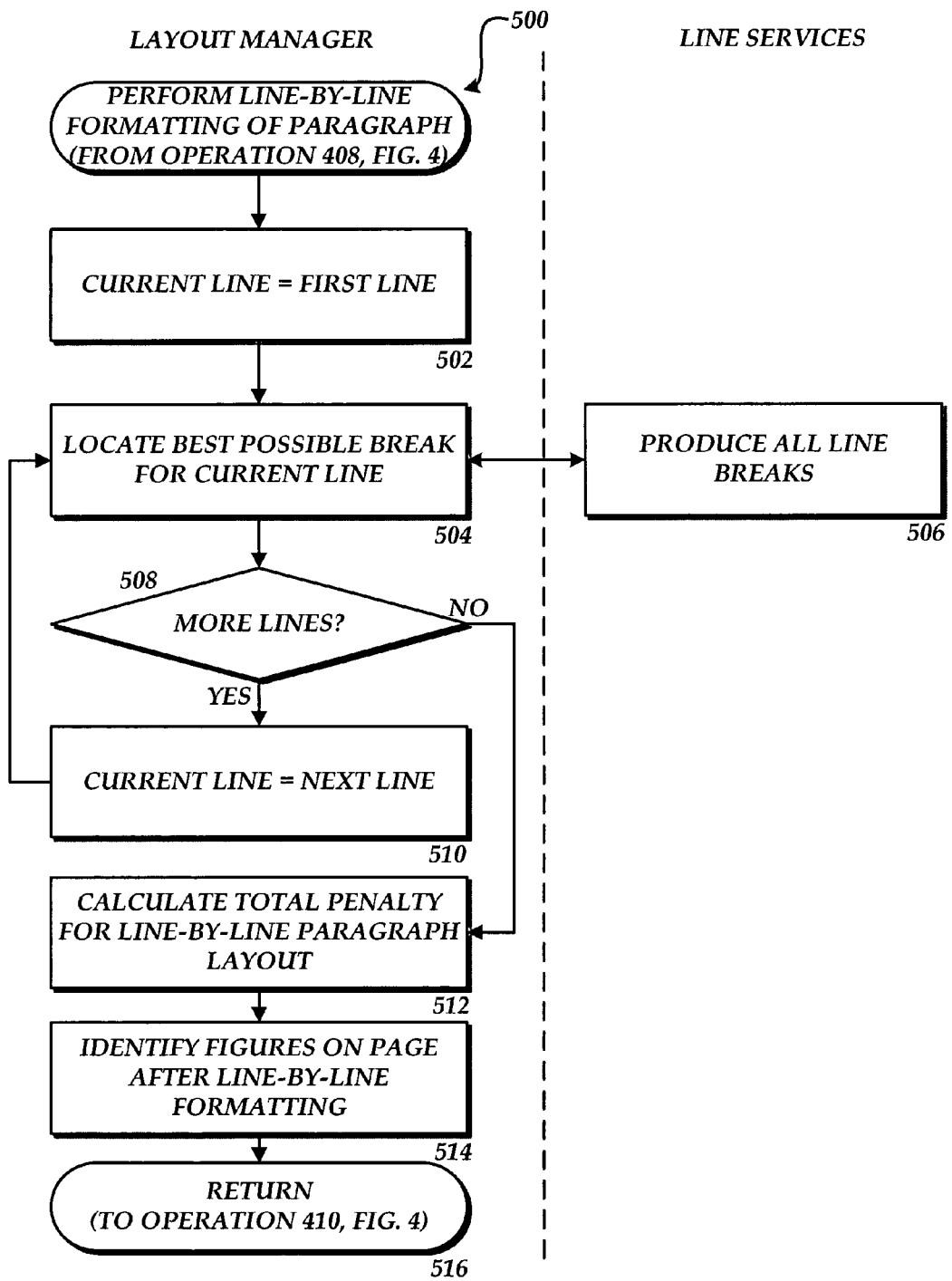

Referring now to FIG. 5, an illustrative routine 500 will be described for performing a line-by-line paragraph layout. In particular, the routine 500 begins at operation 502, where the first line in the paragraph is identified as the current line. The routine 500 then continues to operation 504, where the best possible break is located for the current line. This may be accomplished by communicating with the line services component 27 and requesting that the line services component 27 produce all possible line breaks for the line. This process occurs at operation 506. Once all possible breaks have been identified, the layout manager 26 can compute a penalty for each line and choose the best possible break for each line. It should be appreciated that this process takes place with respect to each line without considering the penalties from other lines. From operation 504, the routine 500 continues to operation 508.

At operation 508, a determination is made as to whether additional lines of text remain to be processed. If additional lines remain to be processed, the routine 500 continues from operation 508 to operation 510 where the next line in the paragraph is identified as the current line. The routine 500 then returns from operation 510 to operation 504, where the processing described above again takes place.

If, at operation 508, it is determined that no additional lines remain to be processed, the routine 500 branches from operation 508 to operation 512. At operation 512, the total penalty for the line-by-line paragraph is calculated by summing the individual line penalties for each line in the paragraph. The total penalty is utilized to eliminate possible layout nodes from consideration where the penalty for the layout node is greater than the penalty for the line-by-line paragraph.

From operation 512, the routine 500 continues to operation 514 where any figures present on the same page as the paragraph after line-by-line formatting are identified. As described above, nodes that cause any of these figures to be pushed to a subsequent page may be removed from the node pool. From operation 512, the routine 500 continues to operation 516, where it returns to operation 410, described above with respect to FIG. 4. It should be appreciated that the method illustrated in FIG. 5 is but one way of performing a line-by-line layout and that other methods may be utilized.

It should be appreciated that the processing described above with respect to FIGS. 4A-4C and 5 lays out a single paragraph only. Additional passes through the various operations described herein may be made to process all of the paragraphs on all of the pages of a document. It should also be appreciated that the processing illustrated in FIGS. 4A-4C and 5 is merely illustrative and that other processing routines may be utilized to lay out the lines within a paragraph.

Figure 6:
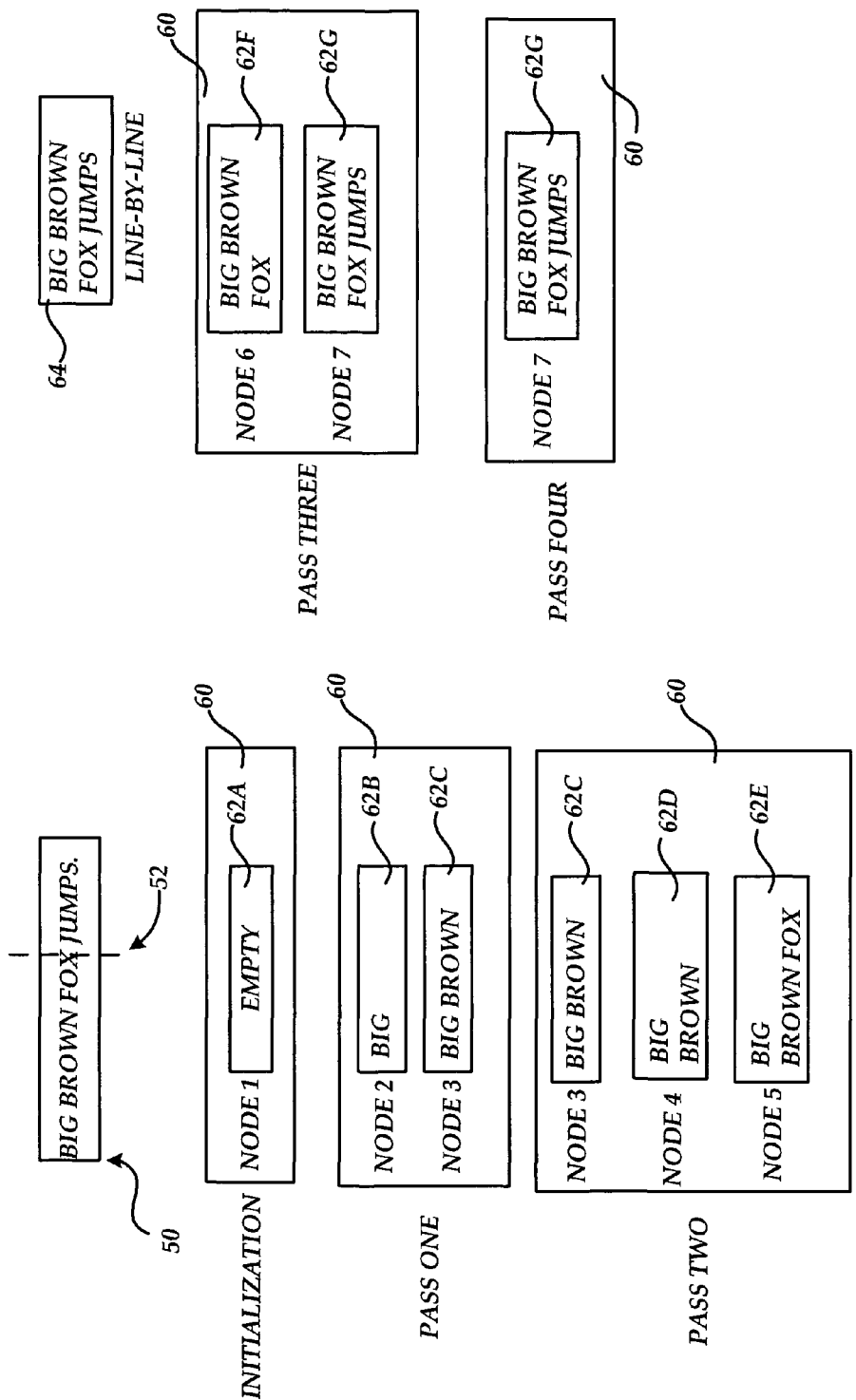
FIG. 6 is a block diagram illustrating the application of the routine shown in FIGS. 4A-4C and 5 to an exemplary paragraph of text.

Referring now to FIG. 6, the application of the routine described above with respect to FIGS. 4A-4C and 5 to an exemplary paragraph 50 of text will be discussed. In particular, FIG. 6 illustrates the layout nodes 62A-62G present in the node pool 60 after each iteration. On initialization, the node pool 60 includes an empty node 62A. After the first pass, the node pool 60 includes layout nodes representing the two possible formats for the first line of text. In particular, the node pool 60 contains the layout nodes 62B and 62C. The layout node 62B is the current node for the second pass since it contains the least amount of content.

During pass two, each possible variant of second line is added to the layout node 62B. As a result, the layout nodes 62D and 62E are added to the node pool. The node 62D is removed because it has a larger penalty than the node 62E. The node 62B is removed because it is was the current node for pass two. The node 62E is removed from the node pool because it has a higher penalty than the computed line-by-line format 64. Accordingly, the node 62C is chosen as the current node for the third pass.

During pass three, each possible variant of second line is added to the layout node 62C. As a result, the layout nodes 62F and 62G are added to the node pool. The node 62C is removed from the node pool because it is the current node. The node 62F is removed from the node pool because it has a higher penalty than the line-by-line format. On pass four, the layout node 62G is the last remaining node and it represents the entire paragraph 50. Accordingly, the layout node 62G is chosen as the optimized best fit paragraph layout.

Based on the foregoing, it should be appreciated that the various embodiments of the invention include a method, system, apparatus, and computer-readable medium for optimized paragraph layout. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for laying out a paragraph of text on a page, the method comprising:
creating a node pool for storing a plurality of nodes, the node pool comprising a current node having a minimum amount of content associated with the paragraph;
generating at least one layout node that corresponds to the current node plus each possible layout of a line of the text associated with the paragraph, wherein generating the at least one layout node comprises identifying all possible breaks for the line of the text following the current node;

identifying any changes to a visible geometry of the page caused by a possible layout of the paragraph defined by the at least one layout node;

storing the identified changes to the geometry of the page caused by the possible layout of the paragraph in a memory associated with the at least one layout node;

producing a line-by-line paragraph layout for the text to determine a maximum penalty for the paragraph, wherein producing the line-by-line paragraph layout for the text to determine the maximum penalty for the paragraph comprises:

iteratively processing the text to locate a best possible break for each line of the text, calculating a total penalty for the line-by-line paragraph layout by summing a line penalty for each line of the text in the paragraph, identifying any figures that are on the page containing the paragraph after producing the line-by-line layout of the paragraph, and removing all layout nodes from the node pool that cause any of the figures identified during the line-by-line layout to be pushed to a next page;

calculating a node penalty for the generated at least one layout node, wherein calculating the node penalty comprises utilizing a hyphenation quality factor when the generated layout nodes include a hyphenation parameter;

determining when a first hyphenation has a better hyphenation quality than a second hyphenation, wherein at least one of a plurality of factors are used to determine the better hyphenation quality, wherein the first hyphenation is assigned to the hyphenation parameter when the first hyphenation has the better hyphenation quality than the second hyphenation and the second hyphenation is assigned to the hyphenation parameter when the second hyphenation has the better hyphenation quality than the first hyphenation;

determining whether the plurality of nodes in the node pool exceed in quantity a threshold number of nodes;

in response to determining that the plurality of nodes in the node pool exceed in quantity the threshold number of nodes, removing higher-penalty layout nodes from the node pool;

adding each layout node to the node pool that has the node penalty less than the maximum penalty for the paragraph;

removing the current layout node from the node pool; and repeating the generating, calculating, adding, and removing operations until only a single node remains in the node pool that represents the paragraph of text.

2. The method of claim 1, wherein calculating the node penalty for each of the generated nodes comprises:

defining an acceptable typography limit;

determining whether the line penalty for each line of the text exceeds the acceptable typography limit; and in response to determining that the line penalty for each line of the text exceeds the acceptable typography limit, calculating the line penalty for each line of the text utilizing a second penalty function not based on typographic rules.

3. The method of claim 2, wherein calculating the node penalty for each of the generated nodes comprises:

identifying a set of justification opportunities on each line of the text;

determining an amount by which each of the justification opportunities are operative to be one of: expanded or compressed within the defined acceptable typography limit;

calculating the total amount of expansion and compression possible on each line of the text; and calculating the line penalty based on an ideal width of each line of the text, an actual width of the line, and possible amounts of expansion and compression.

4. The method of claim 3, wherein generating the at least one layout node comprises:

identifying one of the plurality of layout nodes in the node pool as the current node; and creating at least one new layout node from the current layout node by appending each possible variant of a next line of the text to the current layout node.

5. The method of claim 4, further comprising:

determining whether any layout nodes of the plurality of layout nodes in the node pool end at a same point in the text;

in response to determining that at least two layout nodes in the node pool end at the same point in the text, determining whether the geometry defined within each of the layout nodes is different as a result of a page object through a comparison of the changes to the geometry of the page caused by the possible layout of the paragraph stored in the memory associated with each layout node; and in response to determining that the geometry is not different as the result of the page object, removing one of the at least two layout node ending at the same point in the text that has a highest penalty.

6. The method of claim 5, further comprising caching formatting information for the paragraph for utilization during the line-by-line layout of the paragraph.

7. A computer-readable storage medium having a set of instructions which, when executed perform a method for laying out a paragraph of text on a page, the method executed by the set of instructions comprising:

creating a node pool for storing at least one layout node, wherein creating the node pool for storing the at least one layout node comprises creating a current layout node in the node pool that stores a minimum amount of content associated with the paragraph;

adding a first node to the node pool, wherein the first node is empty;

generating the at least one layout node that corresponds to the current node plus each possible layout of a line of the text associated with the paragraph, wherein generating the at least one layout node comprises identifying all possible breaks for the line of the text following the current node;

identifying any changes to a geometry of the page caused by a layout of the paragraph defined by the at least one layout node;

storing the changes to the geometry of the page potentially caused by a possible layout of the paragraph in a memory associated with the at least one layout node;

producing a line-by-line paragraph layout for the text to determine a maximum penalty for the paragraph;

identifying any figures that are on the page containing the paragraph after producing the line-by-line paragraph layout;

calculating a node penalty for each of the generated layout nodes utilizing a hyphenation quality factor when the generated layout nodes include a hyphenation parameter;

determining when a first hyphenation has a better hyphenation quality than a second hyphenation, wherein at least one of a plurality of factors are used to determine the better hyphenation quality, wherein the first hyphenation is assigned to the hyphenation parameter when the first hyphenation has the better hyphenation quality than the second hyphenation and the second hyphenation is assigned to the hyphenation parameter when the second hyphenation has the better hyphenation quality than the first hyphenation;

determining whether a current number of nodes in the node pool exceeds a threshold number of nodes;

in response to determining that the current number of nodes in the node pool exceed the threshold number of nodes, removing higher-penalty layout nodes from the node pool;

adding each layout node to the node pool that has the node penalty less than the maximum penalty for the paragraph;

removing all layout nodes from the node pool that cause any of the figures identified after producing the line-by-line layout to be pushed to a next page;

removing the current layout node from the node pool; and repeating the generating, calculating, adding, and removing operations until only a single node remains in the node pool that represents the paragraph of text.

8. The computer-readable storage medium of claim 7, wherein calculating the node penalty comprises:

defining an acceptable typography limit;

determining whether the node penalty for each line of the text exceeds the acceptable typography limit; and in response to determining that the node penalty for each line of the text exceeds the acceptable typography limit, calculating the node penalty for the line utilizing a second penalty function not based on typographic rules.

9. The computer-readable storage medium of claim 8, further comprising instructions for caching formatting information for the paragraph for utilization during the line-by-line layout of the paragraph.

10. The computer-readable storage medium of claim 9, wherein generating the at least one layout node comprises:

identifying the at least one layout node in the node pool as the current node; and creating at least one new layout node from the current layout node by appending each possible variant of a next line of the text to the current layout node.

11. The computer-readable storage medium of claim 10, further comprising instructions for:

determining whether any layout nodes in the node pool end at a same point in the text;

in response to determining that at least two layout nodes in the node pool end at the same point in the text, determining whether the geometry defined within each of the layout nodes is different as a result of a page object through a comparison of the changes to the geometry of the page caused by the possible layout of the paragraph stored in the memory associated with each layout node; and in response to determining that the geometry is not different as the result of the page object, removing one of the at least two layout nodes ending at the same point in the text having a highest.

12. The computer-readable storage medium of claim 7, further comprising instructions for caching formatting information for the paragraph for utilization during the line-by-line layout of the paragraph.

13. The computer-readable medium of claim 7, wherein calculating the node penalty for each of the generated nodes comprises:

identifying a set of justification opportunities on each line of the text;

determining an amount by which each of the justification opportunities are operative to be one of: expanded or compressed within the defined acceptable typography limit;

calculating the total amount of expansion and compression possible on each line of the text; and calculating the line penalty based on an ideal width of each line of the text, an actual width of the line, and possible amounts of expansion and compression.

14. A method for laying out a paragraph of text on a page, the method comprising:

obtaining the paragraph text and properties from a client;

caching formatting information for the paragraph, wherein the paragraph is formatted as one line with an infinite margin, wherein all of the possible breaking points within the line are identified;

performing a line-by-line format of the paragraph;

creating a node pool for storing layout nodes;

adding a first node to the node pool, wherein the first node is empty and wherein a current node is in the node pool comprises a minimum amount of content associated with the paragraph;

creating new nodes equal to the current node and a variant of a next line, wherein all breaks for the next line following the current node are identified;

adding the new nodes to the node pool;

calculating a node penalty for each newly created node;

determining when a first hyphenation has a better hyphenation quality than a second hyphenation, wherein at least one of a plurality of factors are used to determine the better hyphenation quality, wherein the first hyphenation is assigned to the hyphenation when the first hyphenation has the better hyphenation quality than the second hyphenation and the second hyphenation is assigned to the hyphenation when the second hyphenation has the better hyphenation quality than the first hyphenation;

determining whether a current number of nodes in the node pool exceeds a threshold number of nodes;

in response to determining that the current number of nodes in the node pool exceed the threshold number of nodes, removing higher-penalty layout nodes from the node pool;

removing each new node to the node pool that has the penalty greater than a line penalty;

determining if any nodes end at a same point; and removing the current node from the node pool, wherein nodes from the node pool are removed that cause figures to be pushed from the page.

15. The method of claim 14, wherein performing the line by line format of the paragraph comprises:

defining a current line as a first line;

producing all line breaks without consideration of penalties from other lines;

locating a best possible breaking points for the current line;

determining if there are more lines, wherein the next line is the current line, wherein the producing, locating and determining are iteratively processed until there are no more lines;

calculating a total penalty for the line by line paragraph layout to eliminate possible layout nodes from consideration; and identifying figures on the page after the line by line formatting.

16. The method of claim 14, further comprising if there is more than one node after the current node is removed, the routine goes back to define the current node as the node in the pool with the minimum content and continues the routine again until there is a single layout node that represents the entire paragraph.

* * * * *